Figure 1:
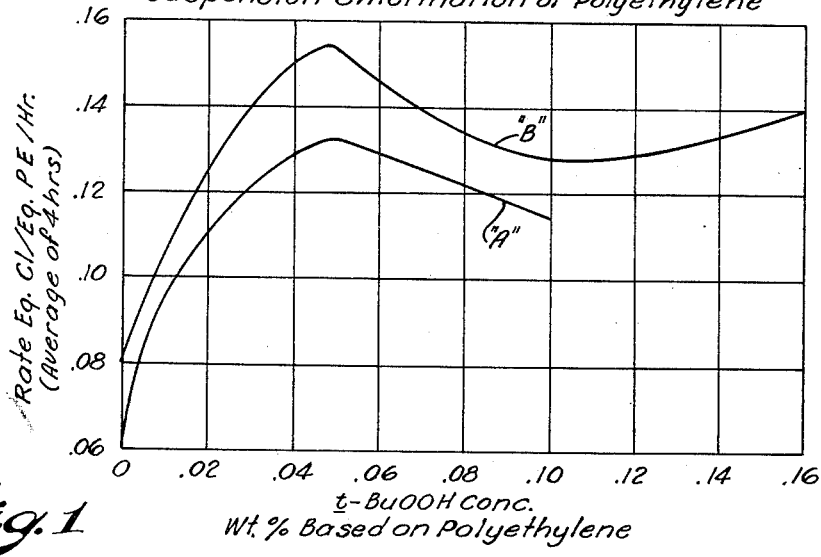

Jan. 1, 1963    F. D. HOERGER    3,071,569
CATALYZED HALOGENATION OF POLYOLEFINS
Filed April 4, 1960    2 Sheets-Sheet 1

INVENTOR.
Fred D. Hoerger
BY
Griswold & Burdick
ATTORNEYS

INVENTOR.
Fred D. Hoerger
BY
ATTORNEY though not limited to the following example. So far as may be noted, all parts and percentages referred to herein are by weight unless otherwise indicated.

3,071,569
CATALYZED HALOGENATION OF POLYOLEFINS
Fred D. Hoerger, Midland, Mich., assignor to The Dow Chemical Company, Midland, Mich., a corporation of Delaware
Filed Apr. 4, 1960, Ser. No. 19,964
14 Claims. (Cl. 260—94.9)

The contribution to the art contemplated and disclosed in the present application, which is a continuation-in-part of the identically entitled, copending application (now abandoned for United States Letters Patent having Serial No. 635,032, filed January 18, 1957, is in the field of organic chemistry, and is particularly concerned with halogenation reactions of various organic polymers.

Diversiform procedures are known and commonly invoked for the halogenation of various high molecular weight polyolefins. Thus, in United States Letters Patent No. 2,183,556, there is described a process for halogenating certain hydrocarbon polyolefins. It involves reacting the polymer with free halogen, optionally in the presence of such halogen carriers as the chlorides of aluminum and tri-valent iron. This process, however, is relatively slow. In its practice, periods of time that are as much as several days may be required for the preparation of products having substantial contents of combined halogen. An improved process, involving the use of certain azo-type catalysts, is proposed in United States Letters Patent No. 2,503,252. The general result of the latter process is to secure greater rates of halogenation than may be achieved by the former. By way of illustration, under the influence of the subject azo-type catalysts, polyethylene may be chlorinated at rates that may, under the most favorable of conditions, be increased up to as much as about 100 percent over the rates that are afforded by the process of the first referred-to patent.

The chief aim and concern of the present invention is to provide an expedient, facile and greatly ameliorated technique for the halogenation of polyolefins to any desired extent whereby eminently satisfactory results may be achieved with even greater and more pronounced celerity than has heretofore been accomplished in the rates of the involved reactions.

Such significant contribution to the art is propitiously possibilitated by practice of the present invention which comprehends catalyzing the halogenation of a finely divided, particulate mass of a polyolefin in an aqueous suspension or slurry with a water-soluble, free radical-generating hydroperoxide catalyst. While halogenation under the influence of such a catalyst may generally be accomplished with advantage at any temperature between about room temperature and about five centigrade degrees below the sintering temperature of the particular polyolefin in water suspension, optimum results and the most rapid rates may usually be accomplished when the halogenation is conducted at a temperature that is in the efficient thermal decomposition range for the catalyst in water. Optionally, and beneficially, the catalyzed reaction may be performed while the suspended slurry is being maintained in an efficiently agitated condition. Remarkable as it may seem, practice of the present invention permits halogenation of polyolefins to be accomplished at rates that are from at least about two to four and more times as rapid as may be effected without catalysis. Halogenated products containing up to 80 percent or more by weight of combined halogen can be readily and quickly prepared in accordance with the invention.

A variety of polyolefins or polymers from ethylenically unsaturated monomers can be halogenated more efficaciously by the practice of the present invention. Generically, these polymers include those that are comprised of recurring —$CH_2$—, —CHR— and —CRG— groups and mixtures thereof, wherein R and G may independently be substituent alkyl or aryl radicals. This, of course, includes various polymers from alkenyl aromatic monomers including polystyrene, polyvinyltoluene and the like and other vinyl polymers from other ethylenically unsaturated monomers. More particularly, however, the invention contemplates the halogenation of high molecular weight hydrocarbon polyolefins including, specifically, polyethylene, polypropylene, polybutylene, various copolymers of hydrocarbon olefins and the like polymeric materials. In this connection, the polyethylene and homologous hydrocarbon olefin polymers that are utilized may be the generally branch structured and side chain-containing variety that are usually obtainable in such manufacturing processes as are exemplified by United States Letters Patent No. 2,153,553; or they may be the essentially linear and relatively unbranched macromolecular species that may be derived by the practice of such manufacuring operations as are described in Belgian Patents Nos. 530,617 and 533,362. In any event, it is particularly advantageous to halogenate normally solid parent polymers in order to derive various halogenated polymer products.

The water-soluble, free radical-generating catalysts that are employed may be of the type that are represented by the formula: XYZCOOH, wherein X, Y and Z are independently selected from the group consisting of alkyl (including cycloalkyl) radicals (that advantageously may contain less than about eight carbon atoms) and hydrogen atoms wherein any two of the alkyl substituents may actually be joined at their terminal portions, as it were, to form and each comprise part of the same cycloalkyl substituent with the limitation that not more than one of the constituents X, Y and Z may be hydrogen. It is generally more advantageous when the total number of carbon atoms in the constituents S, Y and Z is not in exess of about eight. Such compounds are water soluble to the extent (or concentration) that they are required to be present in the aqueous reaction masses in which they are employed as halogenation catalysts and usually decompose efficiently in water at temperatures beneath the sinttering temperatures of the high molecular weight polyolefins that are of more widespread interest to halogenate.

While such typical catalysts as triethylmethylhydroperoxide; pentamethylethylhydroperoxide; 1-methylcyclohexyl-1-hydroperoxide; sec.-butylhydroperoxide; cyclohexylhydroperoxide; 1-hydrohexyl cyclohexyl hydroperoxide; 2,5 - dimethylhexane - 2,5 - dihydroperoxide and pinane hydroperoxide, amongst others of the indicated type, may be employed with salient benefit, it may frequently be found to be of the utmost advantage to utilize tertiarybutylhydroperoxide in the practice of the invention. Usually an amount of the hydroperoxide catalyst, particularly tertiarybutylhydroperoxide, that is in the range between about 0.005 and 1.0 percent by weight, based on the weight of the polyolefin being halogenated, will be found suitable and markedly beneficial to employ in the reaction mass.

The halogenation may be accomplished to combine with or substitute in the polyolefin that is to be halogenated any halogen whose atomic number is $18_{n-1}$ where $n$ has a numerical value of one or two. The halogenating agents that may be utilized for this purpose thus include free chlorine and bromine and their mixtures. Due to its generally greater availability and economic attractiveness, as well as the exceptionally utile characteristics of the halogenated polyolefins obtainable therewith, it may frequently be preferable to practice the present invention with free chlorine as the halogenating agent.

The precise reaction rate that is achieved may be found to vary with such factors as the size, configuration and surface area of the polyolefin particles being halogenated, as well as with the degree of crystallinity encountered when a crystalline polymer is involved.

As might be expected, smaller particles having greater surface area and less crystallinity tend to be halogenated more quickly, with other factors being equal. More vigorous agitation also tends to increase the rate of reaction that may be achieved as, of course, does utilization of more reactive halogenating agents.

The solids content of the suspended reaction mass seems to have little influence on the reaction rates that may be obtained, provided substantial uniformity and homogeneity is maintained in the slurry during the course of the reaction. In this connection, and in the interests of economy and ease of handling, the reaction mass should contain the maximum practical quantity of suspended solids. Usually a slurry that contains from about 2 to 12 or so percent by weight of solids in suspension will be found practical and suitable, although the indicated range is not intended to constitute a hard and fast rule.

Suitable variations with specific polymers and differing physical embodiments thereof may, under particular circumstances, be satisfactory or even necessary. And, as has been indicated, the rate of reaction may vary the temperature that is employed, taking the efficient thermal decomposition range of the catalyst in water into account. Thus, with tertiary butylhydroperoxide, temperatures between about 80 and 95° C. are most advantageous, particularly when essentially linear, macromolecular polyethylene and related hydrocarbon polyolefins are being chlorinated.

In any event and under any given circumstances, catalysis of halogenation reactions in accordance with the present invention effects greatly accelerated rates and secures highly superior results in comparison to what may be obtained without catalysis or by employment of many other types of free radical-generating catalysts.

Advantageously, the polyolefin to be halogenated is suspended in water while it is in a particulate form having an average particle size that is greater than about 400 mesh and finer than about 15 mesh in the U.S. Standard Sieve Series, although relatively larger sized materials may also be suitably employed. The use of the material in a more diminutive form such as a free-flowing powdered mass of the polymer, is generally preferred for the mentioned reasons. If desired, any of a variety of wetting agents, including sulfonates, sulfates, polyphosphates, polyglycolamines and other types of surfactant materials may be suitably employed to assist in perfecting the aqueous suspension of the finely divided polyolefin during its halogenation. The employment of a wetting agent merely facilitates the mechanical handling of the suspended polymer during the reaction and is not essential to obtaining a halogenated product. In many cases there is little necessity for employing wetting agents, especially when a polymer which is undried after its manufacture is being halogenated or when efficient agitation is available for producing and maintaining the polymer slurry.

While a reaction temperature of from about 80° to 95° C. is optimum for chlorinating high molecular weight polyethylene having an essentially linear and unbranched molecular structure and a melting point in the neighborhood of about 125–135° C. under the influence of tertiary butylhydroperoxide, this temperature may vary with the particular softening temperature of other polyolefins that are being halogenated and with other factors. The optimum temperature to obtain the highest rate of reaction with a given catalyst is generally the highest temperature, within the efficient thermal decomposition rate of the catalyst, which can be employed safely without causing the polymer being chlorinated to sinter and fuse. This may vary with the sintering characteristics of the particular polymer being employed. Frequently, the optimum temperature for the reaction will be found to be also in a range between about 5 and 20 centigrade degrees beneath the sintering temperature of the particular polymer that is involved. However, the reaction temperature should also be selected on the basis of being one which is permissive of the presence of sufficient dissolved halogen, such as chlorine, in the suspending media under the pressure being employed for the reaction in order to maintain a satisfactory rate of reaction. In some cases, therefore, operating temperatures may be advantageously utilized which are at the lower end of a desired temperature range being employed in order to insure that sufficient halogenating agent will be present in the suspending media to accomplish the reaction at a desired rate.

Although the catalyzed rate of halogenation usually increases with temperature, care should be taken to avoid higher temperatures which may sinter or fuse the polymer in aqueous suspension. When this occurs, it becomes more difficult to keep the finely divided polymer in a proper state of suspension. It may also lead to non-uniformity in the product. In addition, the reaction is seriously impeded with a sintered polymer because of the relatively great reduction in exposed surface area which is thereby occasioned.

The optimum temperature of reaction may also vary in the course of a particular halogenation due to changes in the softening point of the polymer being halogenated at various combined halogen contents. It may also vary because of a changing solubility of a halogen, such as chlorine, in the polymer being halogenated and in order to facilitate the maintenance of a desirably higher concentration of halogenating agent in the suspending media during the progress of the reaction. The softening points of many halogenated polyolefinic materials, for example, chlorinated linear, high molecular weight polyethylene, may first tend to decrease and then to increase when greater amounts of halogen are combined in the polymer. In such cases it is advantageous to alter the temperature of reaction within permissible limits to meet changing conditions during the reaction so that an optimum temperature at any particular point in the course of the reaction is constantly maintained.

The precise amount of catalyst which is employed under particular circumstances will depend to a great extent on the particular rate of reaction which is desired. Since the rate of reaction usually increases in proportion to the concentration of catalyst being employed, it is advantageous to use only as much catalyst as may be required to complete the reaction within a practical and desired time limit. Excesses of catalyst should be avoided, especially near the termination of the reaction. Unused catalyst materials are frequently extremely difficult to remove from the halogenated product. Hence, it is desirable for substantially all of the catalyst employed to be thermally decomposed at the termination of the reaction. In certain instances, higher catalyst concentrations than those indicated may be preferable to employ, as, for example, when the polyolefin being halogenated has a relatively low reactivity. In addition, certain catalyst samples may display variations from their expected reactivity which may necessitate their being employed in amounts which are greater or lesser than anticipated.

The halogenation reaction in accordance with the present invention may advantageously be carried out at atmospheric pressure although, if desired, superatmospheric pressures may be employed to further accelerate the rate of reaction. The ratio of reactants employed is not critical in the method of the invention. Even so, better results may usually be obtained when the reaction is being conducted under atmospheric pressure by employing amounts of the halogenating agent that are in excess of stoichiometric requirements. This ordinarily results in a maximum reaction rate being obtained. When the reaction is conducted under superatmospheric pressure, a still greater halogenating efficiency may frequently be realized.

The reaction may be carried out batchwise or by continuous processing arrangements. For batch operations it is ordinarily suitable to employ conventional autoclaves and kettles or the like for conducting the reaction. However, it may also be conveniently conducted in a continuous process by any one of several suitable techniques. For example, it may be conducted by countercurrent or concurrent movement of the reactants through either horizontally or vertically disposed reactors which may be in the form of tubes and towers or by using a cascading principle with a series of interconnected reaction chambers.

Substantially quantitative yields, based on the weight of the polymer to be chlorinated, may be obtained by the method of the present invention. The attainment of such yields may often be facilitated by the practice of recycling techniques for unreacted portions of the halogenating agent and by conducting the reaction at more moderate rates.

After a polyolefinic material has been halogenated to a desired degree, it may be filtered from suspension in the inert suspending liquid and washed and dried to prepare it for subsequent use.

In order to further illustrate the invention, but without being restricted thereto, the following docent exemplification is given wherein, unless otherwise indicated, all parts and percentages are to be taken by weight.

FIRST ILLUSTRATION

To first indicate the results of an uncatalyzed reaction, about 112 grams of a finely divided, essentially linear, macromolecular species of polyethylene was slurried with about 1480 milliliters of water and approximately 0.4 gram of a polyglycolamine wetting agent in a flask having a volumetric capacity of about three liters that was fitted with an efficient paddle-type agitator. The great predominance of the polyethylene particles were of an average size that was finer than about 325 mesh. The polymer had an apparent molecular weight (as determined by such of its characteristics as melt viscosity) of about 115,000 and a melting point in the neighborhood of 130° C. The charged ingredients were mixed until an even dispersion was obtained.

The prepared 7 percent slurry was purged with nitrogen while its temperature was being elevated to about 80° C. Chlorine gas was then admitted through an open ended sparger which was immersed in the slurry while the temperature of the reaction mass was synthermally maintained at about 80° C. The chlorine was thus introduced at a uniform rate of about 100 grams per hour with the agitator maintained at a speed of about 350 revolutions per minute (r.p.m.). At the end of about a four hour period the reaction was terminated. The reacted slurry was cooled and purged with nitrogen before it was filtered to remove the halogenated polyethylene. The product was found to contain only about 23.4 percent of combined chlorine. This indicated that the chlorinated polymer contained about 0.24 equivalent of chlorine per equivalent of ethylene in the polymer (0.24 eq. Cl/eq. PE) or, as may otherwise be expressed, about 0.24 chlorine atoms per each pair of carbon atoms in the polymer. Thus, for the entire reaction period, the rate of chlorination without benefit of catalysis was only about 0.06 equivalent of chlorine per equivalent of ethylene in the polymer per hour of chlorination (0.06 eq. Cl/eq. PE/hr.).

In contrast with the foregoing, and in accordance with the present invention, the above procedure was repeated exactly excepting to incorporate about 0.070 gram of a 67 percent aqueous solution of tertiarybutylhydroperoxide (t-BuOOH) in the reaction mass at the commencement of the chlorinated and a like amount of the catalyst at each of three hourly intervals thereafter. At the end of four hours of the catalyzed reaction, the chlorinated polyethylene product was found to contain about 39.8 percent of combined chlorine. This corresponded to 0.53 eq. Cl/eq. PE and to an achieved chlorination rate of about 0.132 eq. Cl/eq. PE/hr. As is apparent, use of the t-BuOOH catalyst increased the rate of reaction by about 120 percent.

In the following Table I, wherein the effect of t-BuOOH as a catalyst for the chlorination of polyethylene in water suspension is evident, the results of several other similarly catalyzed chlorinations are set forth. The above described experimentations are included and designated as being Runs 12 and 13, respectively. Note that Runs 1, 3, 6, 8 and 12 in the first table are indicative of uncatalyzed chlorinations and are included for comparative purposes only. Certain of the characteristics of the parent polyethylenes that were chlorinated are included in the tabulations following Table I. Thus, in Table II, there is included the apparent molecular weights, relative crystallinities and surface areas of the various parent polyethylenes that were utilized in the several runs set forth in Table I. Table III gives the screen analyses of the parent polyethylene samples that were chlorinated.

*Table I*
TERTIARY BUTYLHYDROPEROXIDE AS A CATALYST FOR THE CHLORINATION OF POLYETHYLENE

| Run No. | Properties of parent polyethylene (PE)[1] | Agitation, r.p.m. | Temp., °C. | Catalyst concentration percent by weight on PE/hr.[2] | Percent Cl after 4 hrs.[3] | Eq. Cl/eq. PE after 4 hrs. | Rate eq. Cl/eq. PE/hr. (avg. of 4 hrs) |
|---|---|---|---|---|---|---|---|
| 1[4] | "A" | 510 | 80 | 0.00 | 31.6 | 0.36 | 0.090 |
| 2 | "A" | 510 | 80 | 0.189 | 53.5 | 0.88 | 0.22 |
| 3[4] | "A" | 350 | 80 | 0.00 | 26.2 | 0.28 | 0.070 |
| 4 | "A" | 350 | 80 | 0.189 | 45.8 | 0.64 | 0.16 |
| 5 | "A" | 350 | 80 | 0.047 | 47.0 | 0.680 | 0.170 |
| 6[4] | "A" | 350 | 70 | 0.00 | 29.8 | 0.333 | 0.083 |
| 7 | "A" | 350 | 70 | 0.189 | 40.6 | 0.53 | 0.133 |
| 8[4] | "B" | 350 | 75 | 0.00 | 11.5 | 0.10 | 0.025 |
| 9 | "B" | 350 | 80 | 0.189 | 35.0 | 0.421 | 0.105 |
| 10 | "C" | 350 | 80 | 0.00 | 25.4 | 0.272 | 0.068 |
| 11 | "C" | 350 | 80 | 0.189 | 44.6 | 0.621 | 0.155 |
| 12[4] | "D" | 350 | 80 | 0.00 | 23.4 | 0.24 | 0.06 |
| 13 | "D" | 350 | 80 | 0.047 | 40.6 | 0.53 | 0.132 |
| 14 | "D" | 350 | 80 | 0.0187 | 35.0 | 0.421 | 0.105 |
| 15 | "E" | 350 | 80 | 0.047 | 44.6 | 0.618 | 0.154 |
| 16 | "A" | 350 | 80 | [5]0.37 | 35.6 | 0.429 | 0.107 |
| 17 | "D" | 350 | 80 | [6]0.047 | 32.2 | 0.37 | 0.093 |
| 18 | "D" | 350 | 80 | [7]0.047 | 40.6 | 0.525 | 0.131 |

[1] Refer to Tables II and III.
[2] Calculated as 100 percent hydroperoxide.
[3] As determined by titration of HCl liberated in the reaction. All figures were confirmed by Parr bomb analysis.
[4] Not in accordance with the invention.
[5] This concentration of catalyst was added at the end of 1 hour of chlorination and no further catalyst was added over the rest of the reaction.
[6] Catalyst concentration was added every 2 hours.
[7] Catalyst concentration was added every 0.5 hours.

Table II
PHYSICAL CHARACTERISTICS OF PARENT POLYETHYLENES CHLORINATED UNDER THE CATALYTIC INFLUENCE OF TERTIARYBUTYLHYDROPEROXIDE

| Polyethylene sample | Apparent molecular weight of PE | Percentage crystallinity of PE [1] | Surface area of PE [2] |
|---|---|---|---|
| "A" | 60,000 | 37.7 | 4.81 |
| "B" | 49,000 | 52.8 | 3.68 |
| "C" | 60,000 | 37.0 | 5.79 |
| "D" | 115,000 | 42.5 | 1.55 |
| "E" | 23,000 | 38.5 | 2.77 |

[1] Relative and approximate values as determined by X-ray diffraction techniques with the powdered polymer.
[2] Measured in square meters per gram by nitrogen absorption procedures.

Table III
SCREEN ANALYSIS OF PARENT POLYETHYLENES

| Sample No. | "A" | "B" | "C" | "D" | "E" |
|---|---|---|---|---|---|
| Percentage by weight retained by— | | | | | |
| 35 mesh screen | ([1]) | ([1]) | 9.0 | 41.6 | 1.1 |
| 45 mesh screen | ([1]) | ([1]) | 3.6 | 13.9 | 2.6 |
| 60 mesh screen | 1.0 | 1.2 | 2.9 | 10.9 | 4.7 |
| 80 mesh screen | 0.6 | 0.5 | 2.8 | 9.3 | 20.4 |
| 100 mesh screen | 15.6 | 7.4 | 1.9 | 4.9 | 18.3 |
| 140 mesh screen | 11.9 | 17.8 | 9.5 | 7.9 | 17.4 |
| 200 mesh screen | 21.2 | 41.4 | 18.8 | 6.0 | 8.6 |
| 230 mesh screen | 9.3 | 17.4 | ([1]) | ([1]) | ([1]) |
| 270 mesh screen | 12.1 | 11.3 | 22.3 | 3.0 | 4.1 |
| 325 mesh screen | 22.3 | 2.1 | 19.0 | 1.4 | 9.8 |
| Pan | 6.0 | 0.9 | 10.0 | 1.0 | 12.1 |

[1] Not determined.

Figure 2:
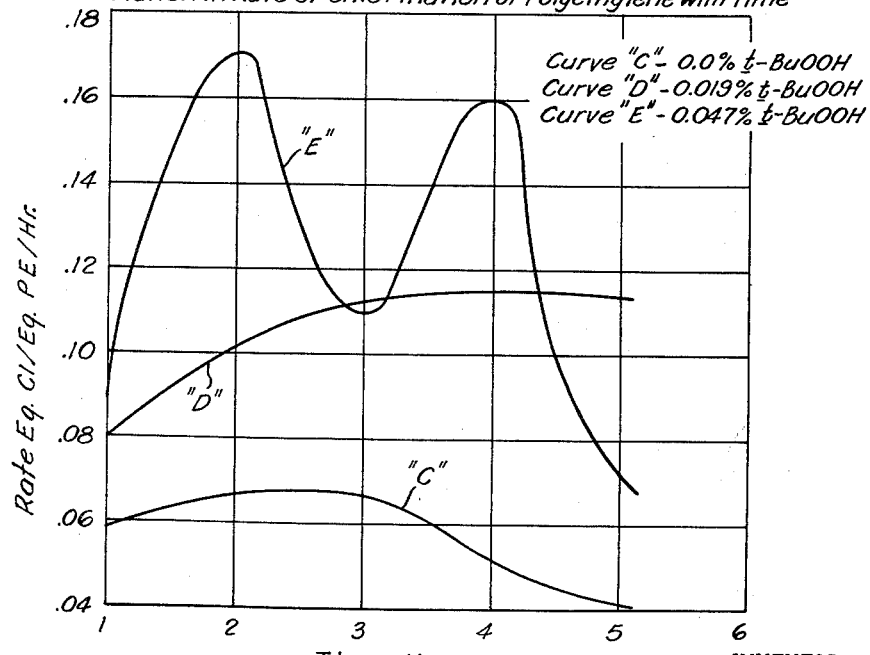

To further illustrate the invention, FIGURE 1 of the accompanying drawing illustrates the effect of catalyst concentration in the chlorination of polyethylene with t-BuOOH. Curve "A" is based on the results of Runs 1 through 7, inclusive, and Run 16 in Table I. Curve "B" is derived from the results of Runs 12, 13, 14, 17 and 18. From the curves, it is apparent that about a 0.05 percent constant concentration of t-BuOOH in the reaction mass during the chlorination of polyethylene provides optimum results. In FIGURE 2 of the drawing there is graphically portrayed various reaction rates that were achieved with and without utilization of the catalyst. Curve "C" is typical of uncatalyzed reactions. Curve "D" shows the marked benefit of even very small quantities of t-BuOOH. Curve "E," which exhibits an unusual double maxima, illustrates the tremendous reaction rates that may be obtained with optimum proportions of the t-BuOOH catalyst.

Analogous excellent results are obtained when tertiarybutylhydroperoxide and either of the water-soluble, free radical-generating hydroperoxide catalysts of the invention, including any of the species particularly delineated herein, are for the more efficacious accomplishment of brominations and to better halogenate, such as to chlorinate and/or brominate, polystyrene, polypropylene, polybutenes and the like polyolefin polymers.

In comparison with the foregoing, much less than 100 percent rate improvement over an uncatalyzed reaction was observed when, in several other experiments conducted in the same general way and under the same general conditions, t-BuOOH was replaced as a catalyst for the chlorination of linear polyethylene with either azobisisobutyronitrile; cumene hydroperoxide; diisopropylbenzene dihydroperoxide or 1-hydroxyl-1-cyclohexyldihydroperoxide.

SECOND ILLUSTRATION

Several additional experiments were performed following the procedure and conditions set forth in the First Illustration using, for purposes of comparison, t-BuOOH as a catalyst with polypropylene and polystyrene and, on a linear macromolecular species of polyethylene similar to that disclosed in said specification, p-menthane hydroperoxide of the formula:

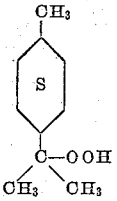

and pinane hydroperoxide of the formula:

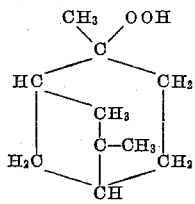

as varied forms of specific catalysts for use in practice of the invention. The results are set forth in the following tabulations, wherein Table IV indicated the results with polypropylene and polystyrene and Table V indicates the results with the several catalyst species tested on polyethylene (with the rates of chlorination and the equivalents of chlorine per equivalent of polymer calculated on the same basis as in said First Illustration).

Table IV
CHLORINATING POLYPROPYLENE AND POLYSTYRENE WITH T-BUTYL HYDROPEROXIDE

| Polymer | Catalyst | Total equivalent | Equivalent per hour |
|---|---|---|---|
| Polypropylene | With t-butyl hydroperoxide | 0.503 | 0.126 |
| Do | Without t-butyl hydroperoxide | 0.246 | 0.062 |
| Polystyrene | With t-butyl hydroperoxide | 0.278 | 0.069 |
| Do | Without t-butyl hydroperoxide | 0.215 | 0.054 |

Table V
CHLORINATING POLYETHYLENE WITH VARIOUS CATALYSTS

| Polymer [1] | Catalyst | Total equivalent | Equivalent per hour |
|---|---|---|---|
| Linear polyethylene No. 1 | p-Menthane hydroperoxide | .183 | .045 |
| Do | t-Butyl hydroperoxide | .415 | .104 |
| Do | No catalyst | .143 | .036 |
| Linear polyethylene No. 2 | Pinane hydroperoxide | .279 | .070 |
| Do | No catalyst | .187 | .047 |

[1] Linear polyethylenes Nos. 1 and 2 were actually two different product forms, with diverse molecular weight distributions, of the same general type of macromolecular parent polymers.

Results at least commensurate with those indicated in Table IV are obtained when the other catalyst species included in Table V are employed in the chlorination and other halogenation of polypropylene, polystyrene, and so forth.

THIRD ILLUSTRATION

Figure 3:
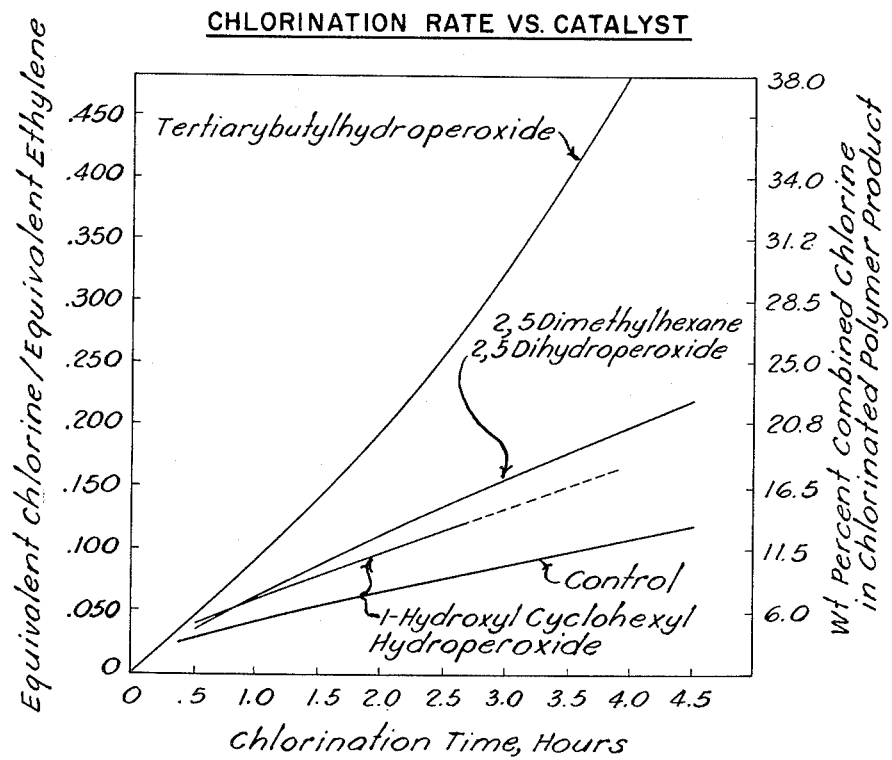

Several further experiments following the procedure and conditions set forth in the foregoing illustrations were performed using, as the polyolefin being halogenated, a linear macromolecular species of polyethylene similar to that employed in the First and Second Illustration and, as other catalysts besides t-BuOOH, 2,5-dimethylhexane-2,5-dihydroperoxide and 1-hydroxyl cyclohexyl hydroperoxide. The results are graphically demonstrated in the graph of FIGURE 3 of the accompanying drawing.

Since certain changes and modifications can readily be entered into in the practice of the present invention without departing substantially from its spirit or scope, it

What is claimed is:

1. Method for chlorinating normally solid polyethylene which comprises: (1) forming an aqueous suspension of said polyethylene in a finely divided, particulate form; (2) incorporating and maintaining in said aqueous suspension between about 0.005 and 1.0 percent by weight of tertiarybutylhydroperoxide as a catalyst; and (3) subjecting the water-suspended polyethylene to the action of free chlorine at a temperature between about 80° and 95° C.

2. The method of claim 1, wherein the polyethylene is an essentially linear and unbranched, macromolecular species of the polymer.

3. The method of claim 1, wherein the polyethylene has an average particle size between about 15 and 400 mesh in the U.S. Sieve Series.

4. The method of claim 1, wherein said aqueous suspension contains between about 2 and 12 percent by weight of suspended solids.

5. The method of claim 1, and including the step of mechanically agitating the reaction mass during the chlorination.

6. The method of claim 1, wherein about 0.05 percent by weight of the catalyst is incorporated and maintained in the suspension during the chlorination.

7. Method for halogenating a hydrocarbon polyolefin which comprises: (1) forming an aqueous suspension of said polyolefin in a finely divided, particulate form; (2) incorporating in said aqueous suspension between about 0.005 and 1.0 percent by weight, based on the weight of the polyolefin to be halogenated, of a water-soluble, free radical-generating hydroperoxide catalyst having the general formula: XYZCOOH, wherein X, Y and Z are independently selected from the group consisting of one to eight carbon alkyl and cycloalkyl radicals and hydrogen atoms wherein any two of such constituents may together form a single large cycloalkyl substituent with the limitation that not more than one of the constituents X, Y and Z is hydrogen; and (3) subjecting said water-suspended polyolefin in the presence of said catalyst to the action of a halogen of atomic number from 17 to 35 at an efficient thermal decomposition temperature for said catalyst in water.

8. The method of claim 7, wherein the total number of carbon atoms in the constituents X, Y and Z of the hydroperoxide catalyst does not exceed eight.

9. The method of claim 7, wherein the catalyst is tertiarybutylhydroperoxide.

10. The method of claim 7, wherein the halogenating agent is free chlorine.

11. The method of claim 7, and including the step of mechanically agitating the reaction mass during the halogenation.

12. The method of claim 7, wherein said quantity of incorporated catalyst is maintained in the suspension throughout the halogenation.

13. The method of claim 7, wherein the polyolefin is a high molecular weight, normally solid hydrocarbon polyolefin.

14. The method of claim 7, wherein said polyolefin is polyethylene and wherein the water-suspended polyolefin is subjected to the action of said halogen at a temperature between about 80° and 95° C.

References Cited in the file of this patent

UNITED STATES PATENTS

| | | |
|---|---|---|
| 2,503,252 | Ernsberger | Apr. 11, 1950 |
| 2,695,899 | Becker | Nov. 30, 1954 |
| 2,913,449 | Hoerger | Nov. 17, 1959 |
| 2,981,728 | Lanning | Apr. 25, 1961 |

OTHER REFERENCES

Modern Plastics, March 1959, pages 135–144.